May 14, 1935.  A. ARUTUNOFF  2,001,649
SUBMERGIBLE ELECTRIC MOTOR
Filed Oct. 20, 1933
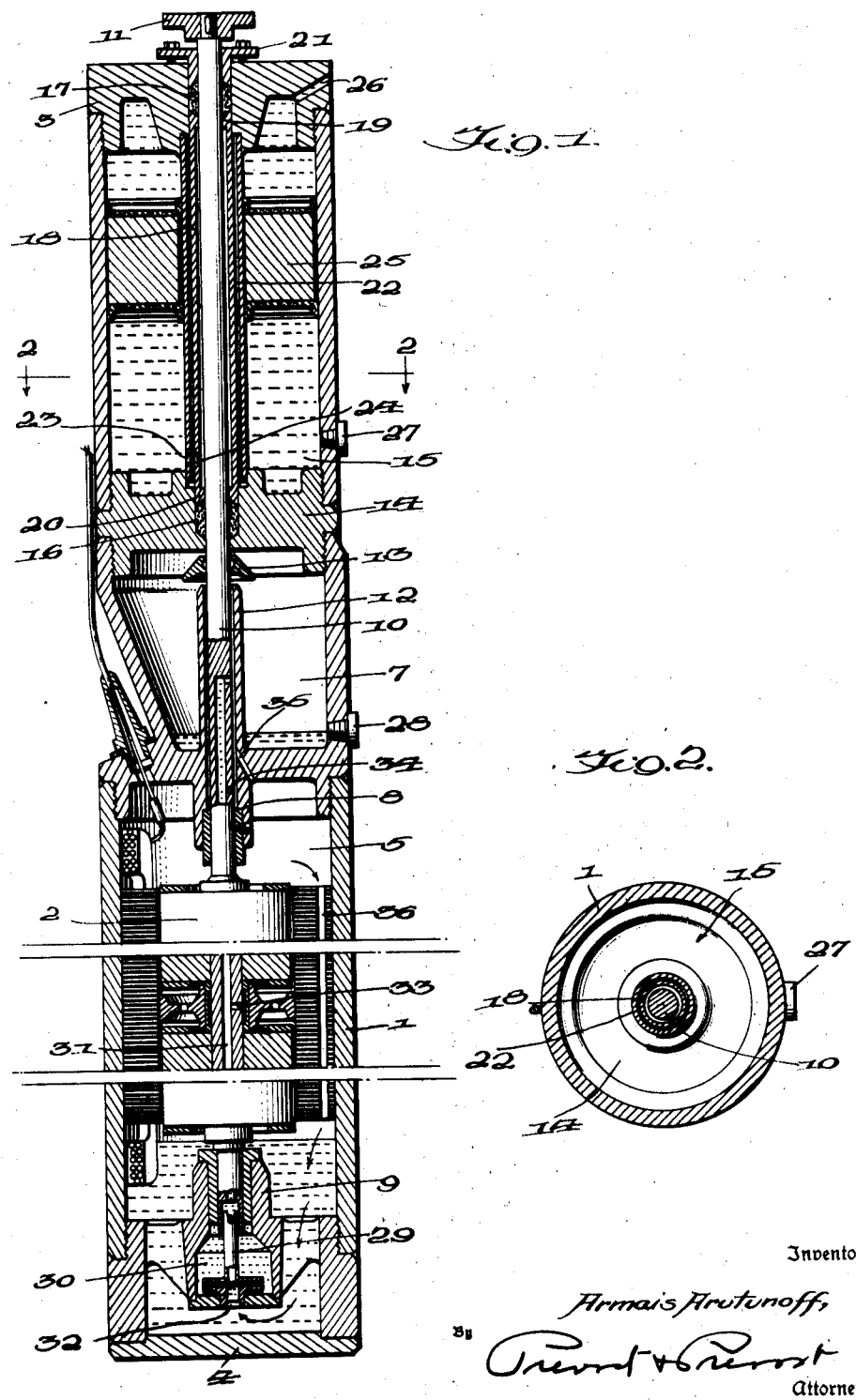
Inventor
Armais Arutunoff,
By Prevost & Prevost
Attorneys Patented May 14, 1935

2,001,649

UNITED STATES PATENT OFFICE 2,001,649

SUBMERGIBLE ELECTRIC MOTOR

Armais Arutunoff, Bartlesville, Okla., assignor to Reda Pump Company, Bartlesville, Okla.

Application October 20, 1933, Serial No. 694,509

14 Claims. (Cl. 172—36)

My invention consists in new and useful improvements in submergible electric motors and has for its object to provide a simple and efficient means whereby the motor is protected from the surrounding fluid such as oil, water, or other medium which might endanger the working parts of the motor.

Heretofore in submergible electric motors, oil or other fluids have been used as the protecting medium, and while such devices have been satisfactory in connection with motors of small diameter, they have proven unsuitable for motors of large diameter and those which are required to operate at high peripheral speed. Obviously large motors operating under high speed conditions cause considerable friction which ofter results in the boiling of the oil or other protecting fluid, thus rendering the protection inadequate.

It is the primary object of my present invention to overcome these disadvantages and to this end I have provided a mechanism whereby air or gas may be employed as the protecting medium thereby reducing friction on the motor parts to a minimum.

Briefly, my invention consists in an air or gas filled submergible electric motor safe-guarded against entrance of the well fluid by means of a relatively heavy piston acting upon oil or grease in a chamber arranged co-axially of the motor and motor shaft, the action of said plunger being supplemented by the pressure of the surrounding fluid.

A further object of my invention is to provide protecting means of this character wherein working parts are reduced to a minimum.

A still further object of my invention resides in the particular adaptation of this principle to motors for use in connection with deep well pumps and the combination therewith of means for lubricating the motor and shaft bearings.

With the above and other objects in view which will appear as the description proceeds, my invention consists in the novel features herein set forth, illustrated in the accompanying drawing and more particularly pointed out in the appended claims.

Referring to the drawing in which numerals of like character designate similar parts throughout both views, Fig. 1 is a longitudinal section of the motor unit showing the relative location of the protecting means with respect to the motor, and Fig. 2 is a transverse section taken on line 2—2 of Fig. 1.

In the drawing, 1 represents a cylindrical casing or housing for a vertical electric motor 2 and is provided at its upper and lower extremities with closures 3 and 4, respectively. The lower portion of the housing 1 forms a motor chamber 5 bounded at its upper extremity by a transverse partition 6 which also forms the lower boundary of an overflow grease receptacle 7.

The motor 2 is mounted within the chamber 5 in suitable bearings 8 and 9 carried by the partition 6 and the lower portion of the housing 1, respectively, and is provided with a vertical shaft 10 which extends longitudinally through the entire housing 1, projecting at its upper end above the upper closure 3 where it is provided with a suitable coupling 11 for operative engagement with a pump shaft or the like.

The upper face of the partition 6 is provided with an upwardly extending concentric sleeve 12 which may be integral with said partition or rigidly secured thereto so as to completely seal the major portion of the receptacle 4 from communication with the shaft 10, said sleeve terminating at its upper extremity at a point adjacent the upper end of the receptacle. Immediately above the free end of the sleeve 12 I provide a shedder 13 fixed on the shaft 9 and overhanging said sleeve whereby any grease or oil which may find its way to travel along said shaft will be deflected into the receptacle 7 and prevented from entering the motor chamber.

A second transverse partition 14 separates the receptacle 7 from a grease chamber 15 and is provided centrally with a stuffing box 16 for the intermediate portion of the shaft 10, the upper extremity of the shaft 10 extending through a stuffing box 17 housed by the upper closure 3. An annular sleeve 18 is slidably interposed between the stuffing boxes 16 and 17 and surrounds the adjacent portion of the shaft 10, the upper extremity of said sleeve being suitably beveled to form the lower gland 19 of the stuffing box 17, and the lower extremity of said sleeve being suitably beveled to form the upper gland 20 of the stuffing box 16. 21 represents the upper gland of the stuffing box 17 and is provided with suitable means for exerting a pressure on the packing in stuffing box 17, whereby through the medium of the sleeve 18, the packing in stuffing box 16 is simultaneously compressed.

A second sleeve 22 is rigidly secured between the top closure 3 and the partition 14 within the reservoir 15 and is spaced apart from the slidable sleeve 18. The lower extremities of the concentric sleeves 18 and 22 are provided with ports 23 and 24, respectively, whereby grease or oil in the chamber 15 is permitted to enter the clearances between the two sleeves and between the shaft 10 and the inner sleeve 18. It will be noted that the inner periphery of the sleeve 18 is preferably recessed annularly between the gland members at its opposite extremities in order to receive sufficient lubrication for the shaft.

A relatively heavy plunger 25 slidably embraces the periphery of the sleeve 22 and is provided on its upper and lower faces with suitable packing discs to insure its close engagement with the inner walls of the grease chamber 15. That portion of the chamber 15 above the plunger 25 is in communication with the fluid surrounding the housing 1 through an opening 26 whereby the pressure on the grease in chamber 15 caused by the weight of the plunger 25 is supplemented by the external pressure and vice versa. It will be noted that a suitable plugged opening 27 may be provided in the shell adjacent the lower portion of the chamber 15 in order to replenish the charge of grease in the chamber, and a similar plugged opening 28 may be provided adjacent the lower extremity of the receptacle 7 for the removal of grease therefrom when the necessity arises.

The lubricating mechanism for the motor and shaft comprises a centrifugal impeller 29 which is operatively connected to the lower end of the shaft 10 and is housed by a downward extension of the bearing housing 9, the latter forming an impeller chamber 30. The shaft 10 is provided with a central longtitudinally extending passageway 31 which extends from the lower extremity of the shaft to a predetermined point above the motor chamber, preferably terminating approximately adjacent the central portion of the sleeve 12. A clearance is provided between the connection of the impeller 29 and the lower end of the shaft 10 so that upon the rotation of the shaft and in turn the impeller 29, lubricating fluid contained in the lower portion of the motor chamber is sucked into the impeller chamber 30 through a central opening 32 in the bottom of the impeller and is forced by the centrifugal action of the impeller upwardly past said clearance and through the shaft passageway 31. The shaft 10 is provided at predetermined points with radial openings 33 and 34 leading from the passageway 31 to the various bearings of the motor and shaft to effect the lubrication of said bearings, and a return port 35 in partition 6 places the interior portion of the sleeve 12 in communication with the motor chamber, whereby lubricating fluid discharged at the upper extremity of the passageway 31 is returned for recirculation.

Vertical passageways 36 are provided at predetermined points around the field magnet to facilitate the return of the lubricating fluid to the lubricating chamber formed in the lower portion of the motor chamber. It will be noted that a sufficient number of these downward passages 36 are provided to adequately accommodate the small amount of circulating lubricant so that the latter will not come in contact with the cylindrical surface of the rotor to cause unnecessary friction.

The operation of my improved submergible electric motor unit is as follows:—

The lubricating chamber is filled to the proper level with lubricating oil and grease chamber 15 is charged with the requisite amount of grease, after which the unit is submerged in the well and the shaft coupling 11 operatively connected to the adjacent end of a pump shaft or the like. Upon starting the motor, the oil in the motor chamber will circulate from the impeller chamber through the shaft and bearings as just described, thus lubricating the bearings and keeping the motor cool.

Immediately upon submerging the unit the surrounding fluid will enter the top portion of the chamber 15 above the plunger 25 through opening 26, thus creating a supplementary pressure upon the upper face of the plunger 25. This tends to force the grease in chamber 15 through the ports 23 and 24 in the sleeves 22 and 18, respectively, filling the annular clearances between the sleeves and between the inner sleeve and the shaft 10. The grease is prevented from escaping along the shaft 10 by means of the stuffing boxes 16 and 17, said stuffing boxes having been adjusted by manipulation of the upper gland 21 on the upper stuffing box 17 in the manner hereinbefore set out. Obviously if the pressure of the surrounding fluid in the well increases so as to further compress the grease in chamber 15, said grease will be forced upwardly through the stuffing box 17 and out into the well. On the other hand, any grease following a downward course and being forced through the stuffing box 16 will be deflected by the shedder 13 and fall into the receptacle 7 and is thus prevented from entering the motor chamber 5.

As before stated, when it is required to replenish the grease in chamber 15 or remove grease from receptacle 7, this is accomplished through the medium of the plugged openings 27 and 28, respectively.

It will thus be seen that no matter how high a pressure may develop in the well in which this unit is submerged, the endangering well fluid cannot gain access to the interior of the motor because of the constant tendency to exude grease past the stuffing box 19 under the combined pressure of the surrounding well fluid itself and the supplemental pressure caused by the weighted plunger 25.

It is evident that as long as there is a supply of grease or oil in chamber 15, the motor is protected from the surrounding medium, and since only a slight excess of pressure is required to effect the protecting operation, the motor may be insured of protection for many years of continuous service by constructing the grease chamber 15 and the overflow receptacle 7 of suitable capacity.

From the foregoing it is believed that the construction and advantages of my invention may be readily understood by those skilled in the art without further description, it being borne in mind that numerous changes may be made in the details disclosed without departing from the spirit of the invention as set forth in the following claims.

What I claim and desire to secure by Letters Patent is:—

1. In a vertical submergible electric motor unit, a gas chamber, a motor in said gas chamber, a motor shaft, a protecting fluid chamber above said gas chamber and surrounding a portion of said shaft, stuffing boxes around said shaft adjacent the upper and lower extremities of said fluid chamber, means in said fluid chamber for creating therein a pressure greater than that of the submergence pressure, whereby there is a constant tendency for said protecting fluid to slightly exude along said shaft from both extremities of said fluid chamber, and means interposed between said fluid chamber and gas chamber for intercepting any fluid exuded from the lower extremity of said fluid chamber.

2. In a vertical submergible electric motor unit, a gas chamber, a motor in said gas chamber, a motor shaft, a protecting fluid chamber above said gas chamber surrounding a portion of said shaft, stuffing boxes around said shaft adjacent the upper and lower extremities of said fluid chamber, packing in said stuffing boxes, a sleeve slidably embracing said shaft and interposed between the packing in said stuffing boxes, its opposite extremities forming glands for the respective stuffing boxes, means for compressing the packing in one of said stuffing boxes and through said sleeve the packing in said other stuffing box, means in said fluid chamber supplemented by the submergence pressure for creating a pressure therein greater than said submergence pressure, whereby there is a constant tendency for said protecting fluid to slightly exude along said shaft from both extremities of said fluid chamber, and means interposed between said fluid chamber and gas chamber for intercepting any fluid exuded from the lower extremity of said fluid chamber.

3. A submergible electric motor unit as claimed in claim 1 wherein said fluid chamber is provided with a plunger for compressing the fluid therein.

4. A submergible electric motor unit as claimed in claim 1 wherein said fluid chamber is provided with a plunger, that portion of said chamber above said plunger being in communication with the fluid surrounding the unit.

5. A submergible electric motor unit as claimed in claim 1 wherein said fluid chamber is provided with a relatively heavy plunger adapted to exert by gravity a compressing force on the fluid in said chamber.

6. In a vertical submergible electric motor unit, a motor chamber, a motor in said chamber, a protecting fluid chamber above said motor chamber, a motor shaft extending through both chambers, a sleeve surrounding said shaft in said fluid chamber, a plunger slidably embracing said sleeve and adapted to compress fluid in said fluid chamber, stuffing boxes around said shaft adjacent the opposite extremities of said fluid chamber, and an elongated sleeve interposed between said stuffing boxes and terminating in the bottom portion of one stuffing box and the top portion of the other stuffing box, said sleeves being apertured to establish communication between said fluid chamber and said shaft.

7. A submergible electric motor unit as claimed in claim 6 including means for compressing the packing in one of said stuffing boxes and thereby through the medium of said elongated sleeve compressing the packing in the other of said stuffing boxes.

8. A submergible electric motor unit as claimed in claim 6 wherein said fluid chamber is in communication with the fluid surrounding said unit at a point above said plunger for supplementing the pressure exerted by said plunger.

9. In a submergible electric motor unit, a housing, a motor chamber in said housing, a motor in said chamber, a motor shaft extending through said housing, a protecting fluid chamber in said housing surrounding a portion of said shaft, stuffing boxes for said shaft at the opposite extremities of said protecting fluid chamber, packing in said stuffing boxes, and common means for simultaneously compressing the packing in both of said stuffing boxes.

10. In a submergible electric motor unit, a housing, a motor chamber in said housing, a motor in said chamber, a motor shaft, a protecting fluid chamber in said housing surrounding a portion of said shaft, stuffing boxes around said shaft adjacent the opposite extremities of said fluid chamber, means in said fluid chamber for creating therein a pressure greater than that of the submergence pressure, whereby there is a constant tendency for said protecting fluid to slightly exude along said shaft from both extremities of said fluid chamber, and means interposed between said fluid chamber and motor chamber for intercepting any fluid exuded from the adjacent extremity of said fluid chamber.

11. In a vertical submergible electric motor unit, a gas chamber, a motor in said gas chamber, a motor shaft, a protecting fluid chamber above said gas chamber and surrounding a portion of said shaft, stuffing boxes around said shaft adjacent the upper and lower extremities of said fluid chamber, means in said fluid chamber for creating therein a pressure greater than that of the submergence pressure, whereby there is a constant tendency for said protecting fluid to slightly exude along said shaft from both extremities of said fluid chamber, means interposed between said fluid chamber and gas chamber for intercepting any fluid exuded from the lower extremity of said fluid chamber, and means for lubricating said motor and shaft.

12. In a submergible electric motor unit, a gas chamber, a motor in said gas chamber, bearings for said motor, a motor shaft, a protecting fluid chamber above said gas chamber and surrounding a portion of said shaft, stuffing boxes around said shaft adjacent the upper and lower extremities of said fluid chamber, means in said fluid chamber for creating therein a pressure greater than that of the submergence pressure, whereby there is a constant tendency for said protecting fluid to slightly exude along said shaft from both extremities of said fluid chamber, means interposed between said fluid chamber and gas chamber for intercepting any fluid exuded from the lower extremity of said fluid chamber, at least a portion of said shaft being hollow, said hollow portion being provided with radial passageways arranged adjacent said bearings, means for forcing a lubricating fluid through the hollow portion of said shaft to said bearings, and means for returning said lubricating fluid for recirculation.

13. In combination, a gas filled submergible electric motor, a shell housing said motor and forming a gas reservoir, a motor-protecting fluid reservoir within said shell, filled with a noncompressible fluid, and means supplemented by the pressure of the fluid surrounding said shell for constantly maintaining said protecting fluid under a greater pressure than that of said surrounding fluid.

14. In combination, a gas filled submergible electric motor, a shell housing said motor and forming a gas reservoir, a motor shaft extending through said shell, a column of gas in said reservoir surrounding said motor, a protecting fluid reservoir in said housing, a column of liquid in said last named reservoir surrounding a portion of the motor shaft, and means supplemented by the pressure of the fluid surrounding said shell for constantly maintaining said protecting liquid under a greater pressure than that of said surrounding fluid.

ARMAIS ARUTUNOFF.